United States Patent [19]

Iinuma

[11] Patent Number: 5,309,914
[45] Date of Patent: May 10, 1994

[54] ULTRASONIC IMAGING APPARATUS

[75] Inventor: Kazuhiro Iinuma, Tochigi, Japan

[73] Assignee: Kabushiki Kaisha Toshiba, Kawasaki, Japan

[21] Appl. No.: 26,191

[22] Filed: Feb. 26, 1993

Related U.S. Application Data

[63] Continuation of Ser. No. 868,117, Apr. 14, 1992, abandoned.

[30] Foreign Application Priority Data

Apr. 17, 1991 [JP] Japan ................... 3-85510

[51] Int. Cl.[5] .............................................. A61B 8/00
[52] U.S. Cl. ........................... 128/660.07; 128/661.01
[58] Field of Search ................ 128/660.07, 660.08, 128/661.07, 662.06

[56] References Cited

U.S. PATENT DOCUMENTS

| | | | |
|---|---|---|---|
| 4,817,433 | 4/1989 | Sato | 128/660.01 |
| 5,040,225 | 8/1991 | Gouge | 128/660.04 |
| 5,054,492 | 10/1991 | Scribner et al. | 128/662.06 |
| 5,072,734 | 12/1991 | Takeuchi | 128/660.07 |
| 5,111,823 | 5/1992 | Cohen | 128/660.07 |

Primary Examiner—Francis Jaworski
Attorney, Agent, or Firm—Finnegan, Henderson, Farabow, Garrett & Dunner

[57] ABSTRACT

A phased-array ultrasonic probe transmits/receives ultrasonic beams to/from a subject to electronically scan a predetermined part of the subject. A calculation unit calculates cross-correlation function data between adjacent scanning lines obtained by the electronic scan. The cross-correlation function data is supplied to a DSC through a memory. The DSC superimposes organ outline data obtained based on the cross-correlation function data, upon a tomographic image, and an image obtained by the superimposition is displayed on a monitor.

19 Claims, 16 Drawing Sheets

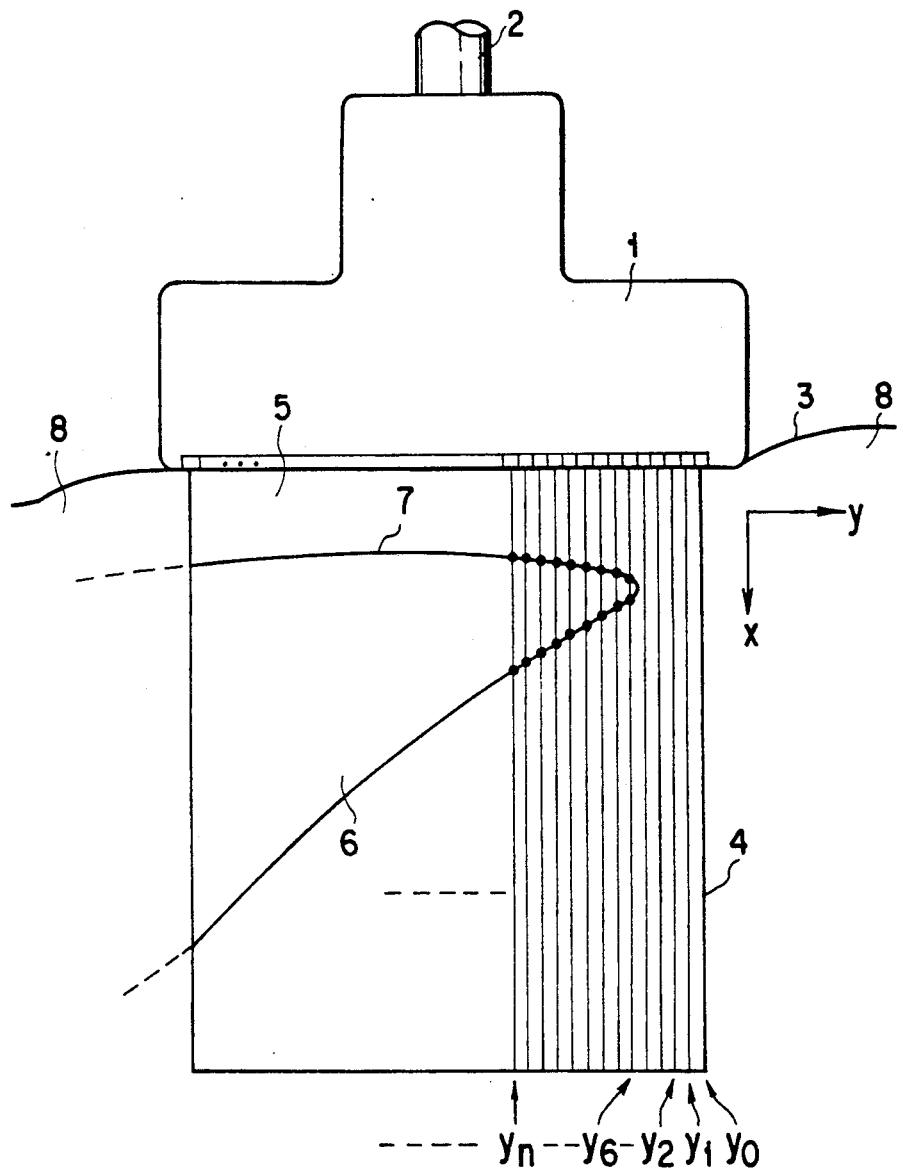
F I G. 1

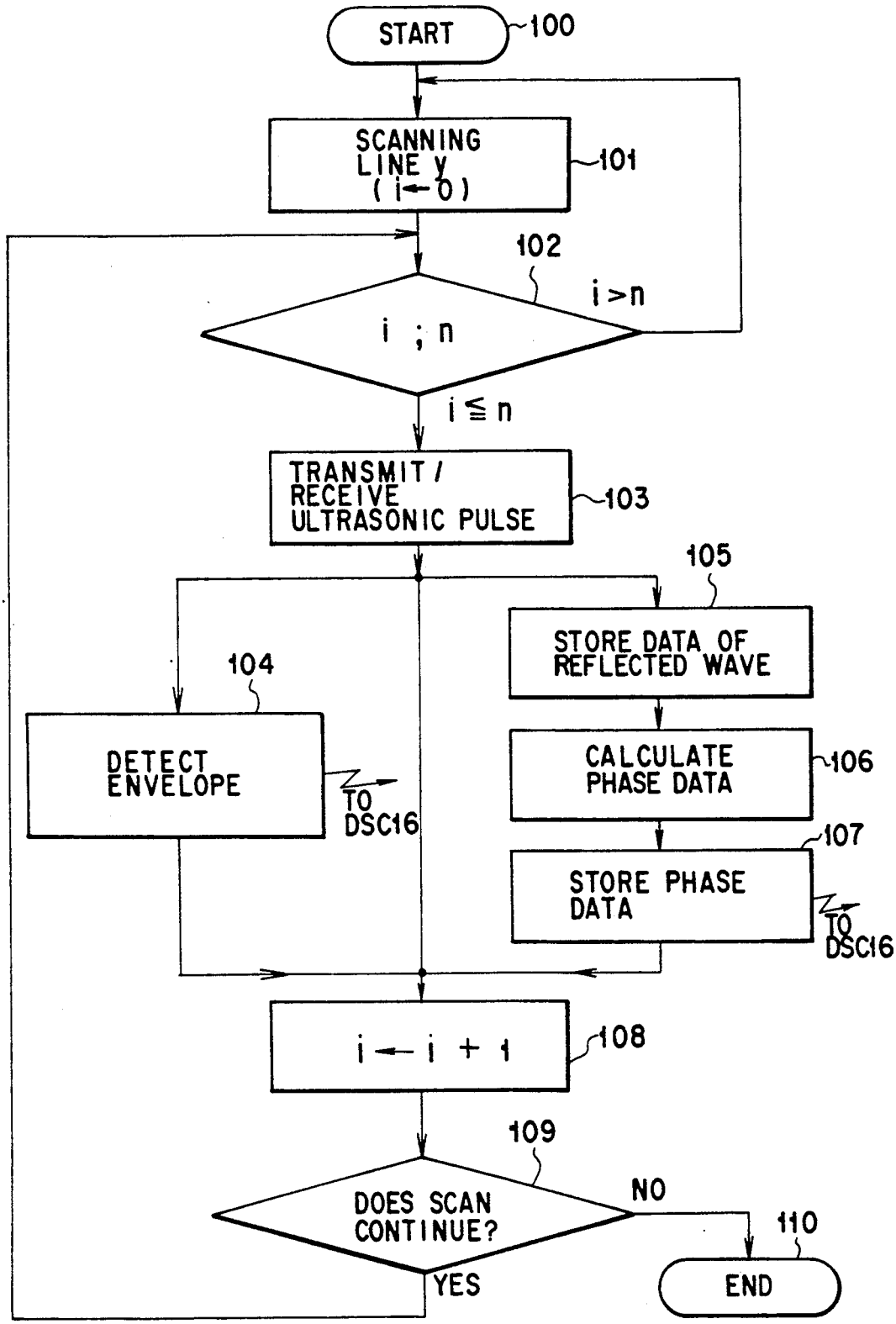
F I G. 4

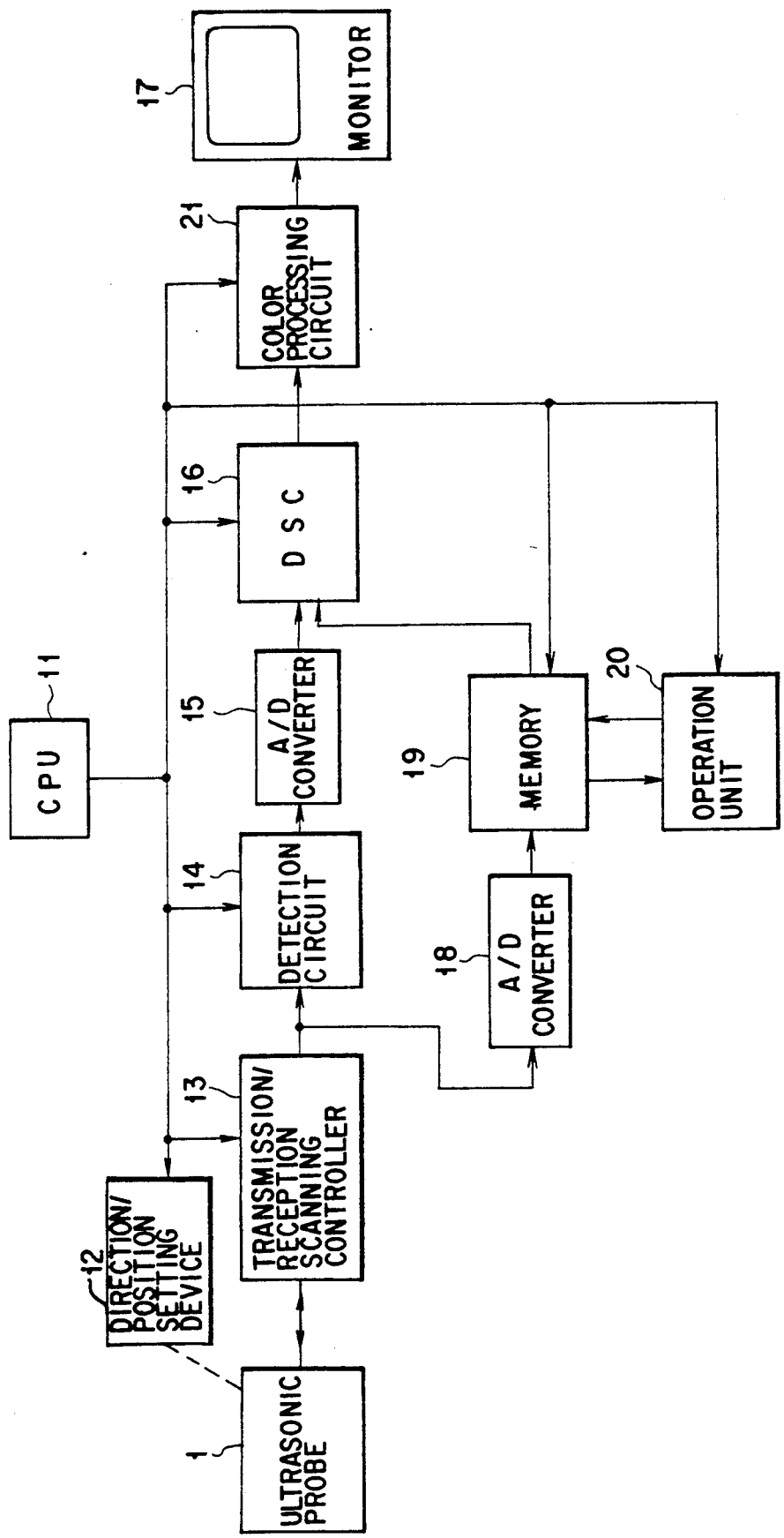
F I G. 11

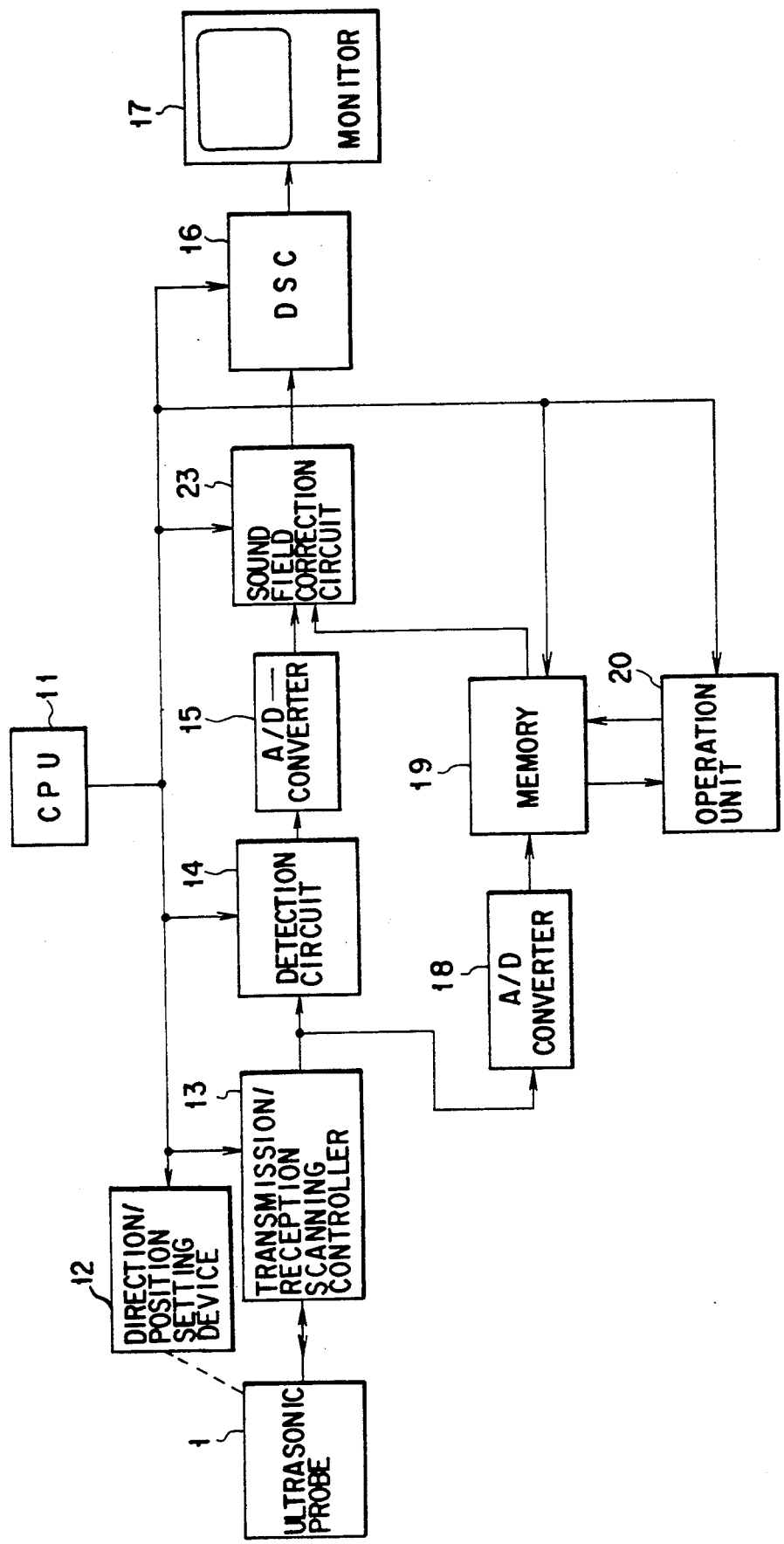
F I G. 16

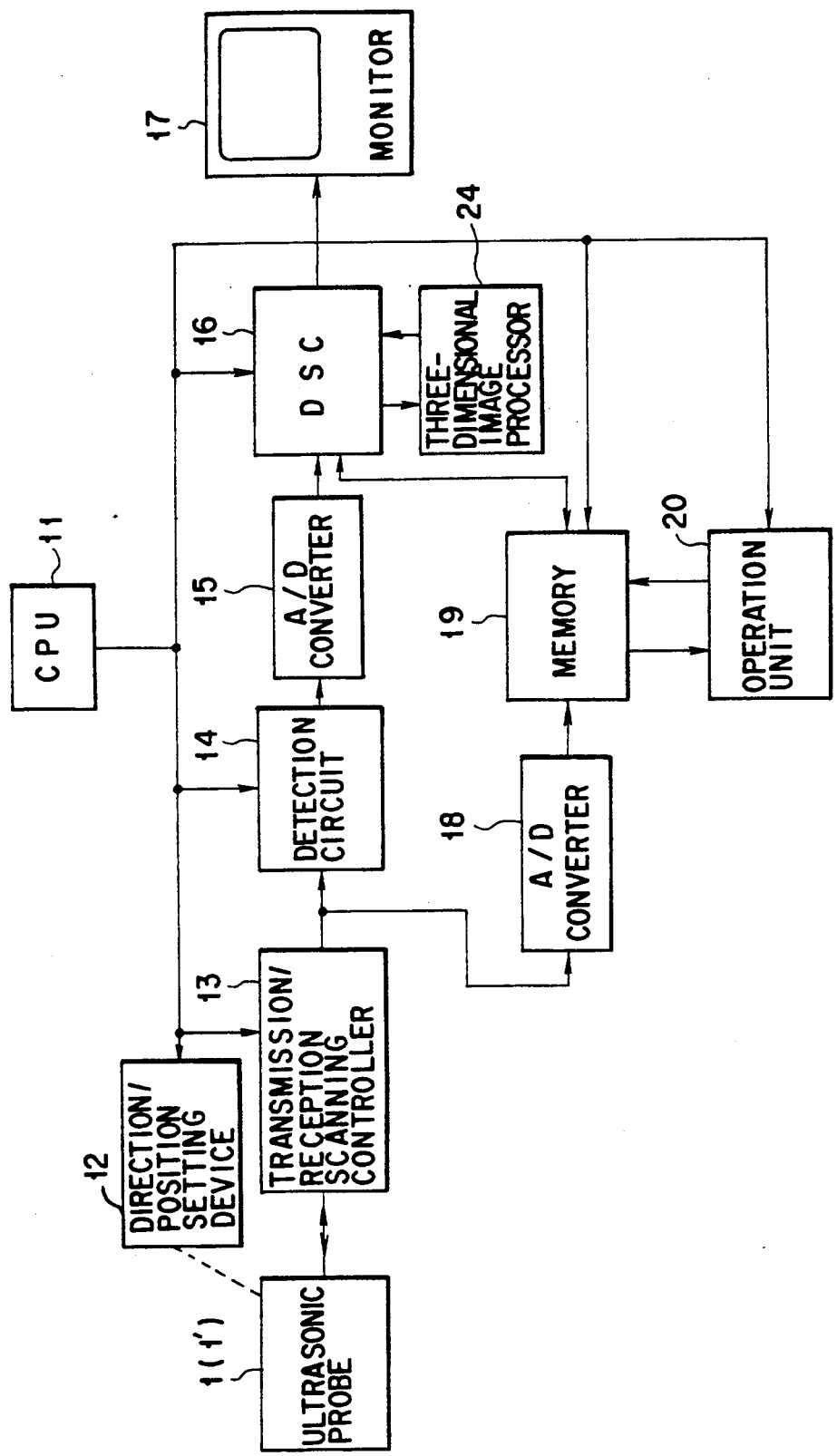
F I G. 21

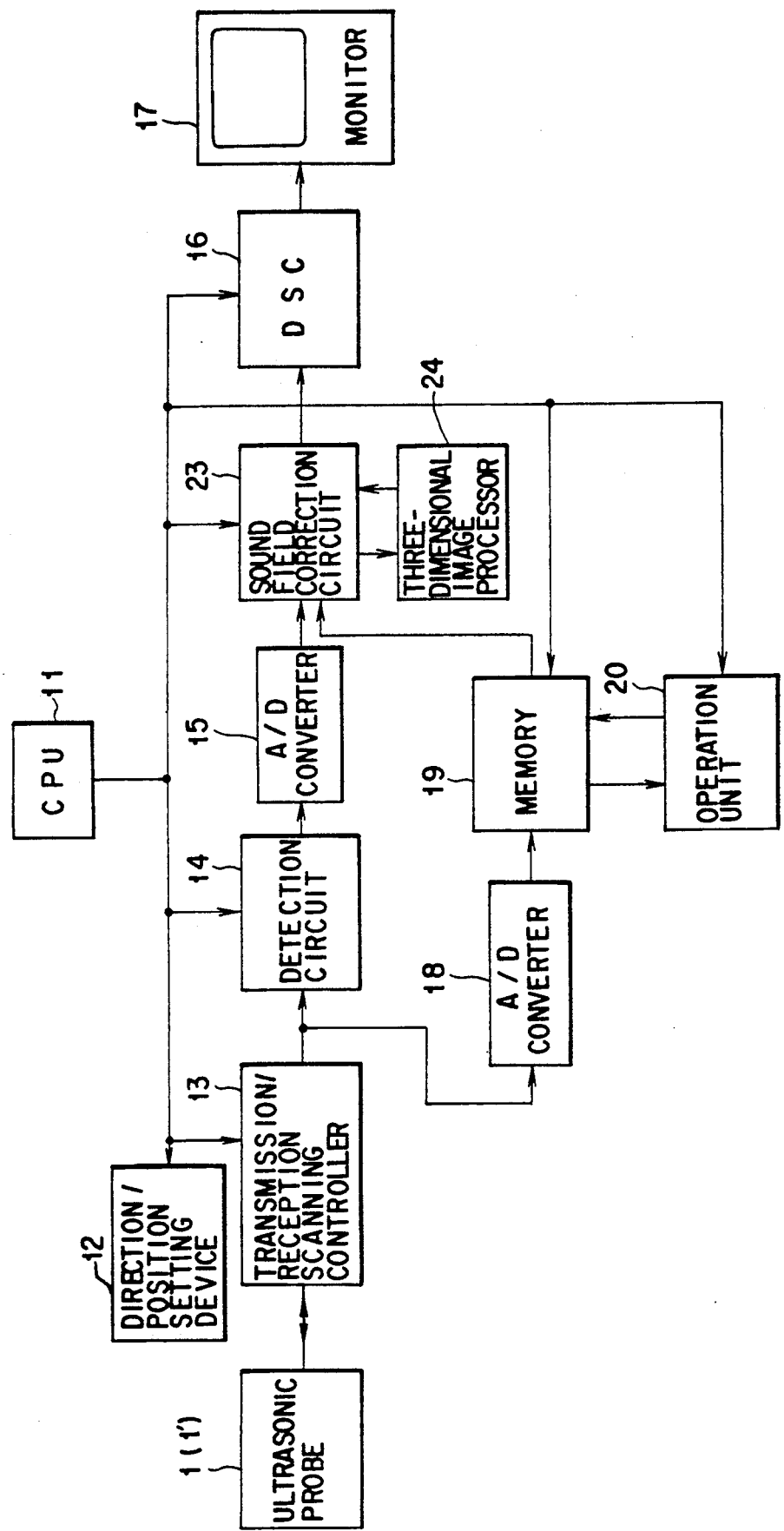
F I G. 24

ULTRASONIC IMAGING APPARATUS

This application is a continuation of application Ser. No. 07/868,117 filed Apr. 14, 1992 now abandoned.

BACKGROUND OF THE INVENTION

Field of the Invention

The present invention relates to an ultrasonic imaging apparatus such as a medical ultrasonic diagnostic apparatus from which ultrasonic information such as tomographic image data is obtained by scanning a subject with an ultrasonic beam.

Description of the Related Art

One feature of an ultrasonic imaging apparatus is that it is able to diagnose a subject more safely and easily than an image diagnostic apparatus such as an X-ray diagnostic apparatus. This feature is a great advantage in diagnosing the subject. The ultrasonic imaging apparatus is now considered indispensable in the diagnosis of subjects, by virtue of this feature.

One example of an ultrasonic imaging apparatus is an apparatus using reflection of ultrasound. In this apparatus, a boundary between different acoustic impedances in ultrasonic waves is imaged, since the ultrasonic waves are reflected by the boundary. The apparatus has a drawback in that it cannot provide diagnostic information more sufficiently than the X-ray diagnostic apparatus which images a difference in absorption of X rays when the X rays penetrate an object, though it has the above-described advantage.

The drawback of the ultrasonic imaging apparatus will be described below, in the context of the liver of a subject being diagnosed. Peritoneoscopy is conventionally used to diagnose a liver, and is performed as follows. A cavity is formed in the surface of a subject and a peritoneoscope is inserted therethrough between the surface of the liver and the peritoneum. A doctor can optically observe the surface of the liver by means of the peritoneoscope. Since the peritoneoscopy is an invasion method, the doctor wishes to avoid using it, if possible.

An alternative is to observe the surface of a liver by way of an ultrasonic imaging apparatus having the feature described above. Since, however, an ultrasonic tomographic image is an image of the boundary between different acoustic impedances, its resolution is low, and a boundary between the liver and other internal organs cannot clearly be distinguished in the ultrasonic tomographic image. More specifically, since the sections of various tissues such as the ventral wall, hepatocyte, and vessels in the liver are imaged together in the ultrasonic tomographic image, the liver and other internal organs cannot be easily distinguished from each other. Further, the boundary between the liver and other internal organs is not represented as a clear thin line. Consequently, it is very difficult to observe the surface of the liver using the ultrasonic tomographic image.

SUMMARY OF THE INVENTION

It is accordingly an object of the present invention to provide an ultrasonic imaging apparatus capable of easily distinguishing the surface structure of a specified part of a subject.

To attain the above object, there is provided an ultrasonic imaging apparatus having an ultrasonic probe for transmitting ultrasonic beams to a subject and receiving the ultrasonic beams from the subject to obtain ultrasonic information about the subject based on ultrasonic reflection data items of ultrasonic scanning lines, comprising:

phase information calculation mean for calculating phase information between ultrasonic reflection data items of at least two of the ultrasonic scanning lines, which are near to each other; and boundary information generation means for generating boundary information about a specified part of the subject based on the phase information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic view of an ultrasonic scan using a phased-array ultrasonic probe according to the present invention;

FIG. 4 is a flowchart showing operation of the ultrasonic imaging apparatus according to the first embodiment;

FIG. 11 is a block diagram of an ultrasonic imaging apparatus capable of color display according to a second embodiment of the present invention;

FIG. 16 is a block diagram of an ultrasonic imaging apparatus capable of correcting a sound field according to a fourth embodiment of the present invention;

FIG. 21 is a block diagram of an ultrasonic imaging apparatus in which three dimensional display and superimposition display are combined, according to a fifth embodiment of the present invention;

FIG. 24 is a block diagram of an ultrasonic imaging apparatus in which three-dimensional display and sound field correction are combined, according to an eighth embodiment of the present invention.

DETAILED DESCRIPTION OF THE PREFERRED EMBODIMENTS

Figure 2:
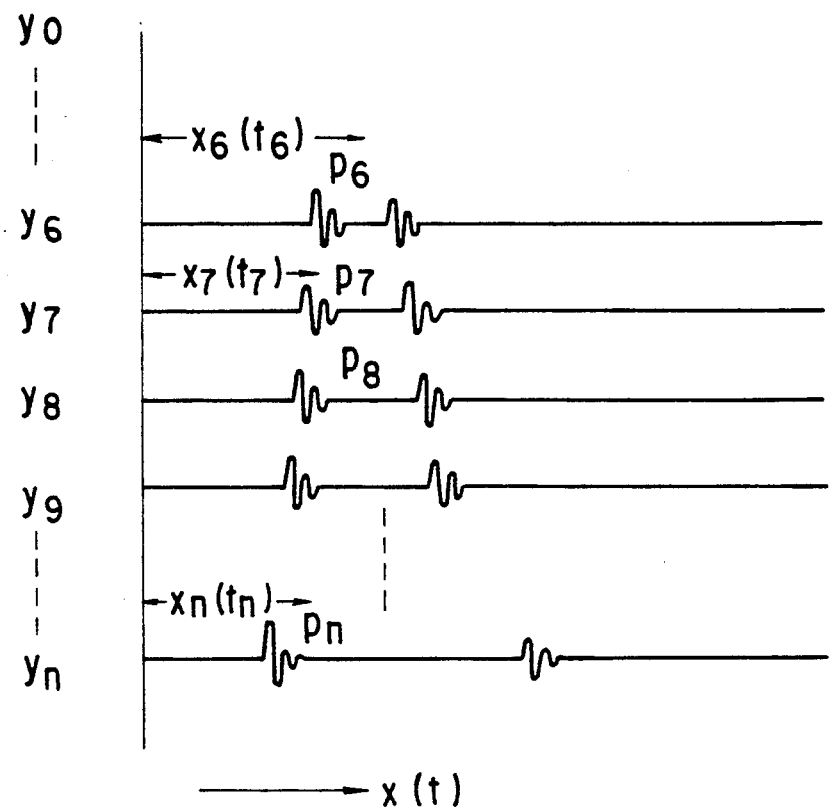
FIG. 2 is a view showing reflected waves containing phase information using a phased array ultrasonic probe according to the present invention.

An ultrasonic imaging apparatus according to a first embodiment of the present invention will now be described, with reference to the accompanying drawings. First, a linear electronic scan using a phased-array ultrasonic probe will be described, with reference to FIG. 1.

As shown in FIG. 1, a phased-array ultrasonic probe 1 is constructed so that a number of thin transducer elements (ultrasonic transducers) are arranged on its bottom. The transducer elements transmit/receive ultrasonic beams through a cable 2. The ultrasonic beams are repeatedly transmitted/received with the underside of the ultrasonic probe 1 in contact with a body surface 3 of a subject 5.

In the linear electronic scan, the transducer elements are shifted every time the transmission/reception of the ultrasonic beams is repeated. More specifically, as shown in FIG. 1, the ultrasonic beams are shifted little by little from the right side of FIG. 1, and luminance modulation signals (represented by dots in FIG. 1) are obtained on scanning lines 4 ($y_0, y_1, \ldots, y_n, \ldots$) corresponding to the ultrasonic beams. An interval between the scanning lines 4 is, for example, 0.5 mm. If an ultrasonic scan is performed with the ultrasonic probe 1 in contact with the body surface 3 of the subject 5, the outline of a liver 6 (hereinafter referred to as liver surface 7) is represented as an unclear line by which a boundary between the liver 6 and other internal organs cannot be distinguished. This unclear line usually corresponds to an ultrasonic tomographic image which is to be displayed on a monitor (not shown), and actually not only the liver surface 7 but also the sections of various tissues such as a ventral wall, hepatocyte, and vessels in the liver 6 are displayed.

An imaging mode for forming the ultrasonic tomographic image is generally called a B mode. In the B mode, amplitude information on ultrasonic reflected waves of the ultrasonic scanning lines is imaged. According to the present invention, however, phase information between ultrasonic reflected waves of at east two nearby ultrasonic scanning lines is imaged.

The phased-array ultrasonic probe includes a probe having transducer elements two-dimensionally arranged on a plane, a convex probe having transducer elements two-dimensionally arranged on a curved surface, a probe having transducer elements arranged three-dimensionally, and the like. These probes are applied to an electronic scan.

A mechanical scan ultrasonic probe is applied to a mechanical scan and includes a normal-sized probe, and a very-small-sized catheter ultrasonic probe which will be described in detail later.

As a single image mode, there is a B mode, a motion mode, a bloodstream imaging mode, and the like. As a scanning method, there is a linear scan, a sector scan, a radial scan, a convex scan, and the like.

The liver surface 7 is represented as an unclear line. FIG. 2 shows reflected waves corresponding to the scanning lines 4. In FIG. 2, the abscissa indicates time t which elapses from when a pulse is emitted, and the reflected waves are shown in correspondence with the scanning line $y_6$ in which a scan of the liver 6 starts and its subsequent scanning lines $y_7$ to $y_n$. If, in the scanning line $y_6$, time required from emission of an ultrasonic pulse to return of its reflected wave from the liver surface 7 is $t_6$, and the average sonic speed of the subject 5 is c, a distance $x_6$ between the body surface 3 and the liver surface 7 is given by the following equation:

$$x_6 = (\tfrac{1}{2}) \cdot c \cdot t_6 \qquad (1)$$

According to the equation (1), the time $t_6$ is proportionate to the distance $x_6$, and time t can be regarded as distance x. If the average sonic speed c the subject 5 is about 1540 m/sec and the distance $x_6$ is 20 mm, the time t is about 26 μsec. To form a tomographic image using these reflected waves, the reflected waves ($P_6, P_7, \ldots, P_n, \ldots$) are detected and an envelope (amplitude information) is used as a luminance modulation signal. If the peaks of the amplitudes of the reflected waves are traced, an image indicative of the liver surface 7 can be detected. However, since a number of reflected waves are reflected by a body part 8 other than the liver surface 7, the peaks cannot be easily detected or and the distance $x_6$ cannot be precisely obtained.

While amplitude information of reflected waves is used in a conventional method, phase information of reflected waves is used in the present invention; therefore, the position of the liver surface 7 can be reliably and precisely detected.

A method of observing the liver surface according to the present invention will be described in detail.

First, a small time interval (for example, 3 $\mu$ sec) including the pulse (wave) $P_6$ reflected by the liver surface 7 in the scanning line $y_6$ is designated, and time $\Delta t_{6,7}$ in which a cross-correlation between the pulse $P_6$ and its subsequent pulse $P_7$ is maximized in the same interval, that is, time corresponding to a shift in phase between the pulses $P_6$ and $P_7$ is obtained. The time interval is then shifted by $\Delta t_{6,7}$, and time $\Delta t_{7,8}$ is obtained from a cross-correlation between pulses $P_7$ and $P_8$. In this way, the same operation continues.

The distances $x_7, x_8, \ldots, x_n, \ldots$ between the body surface 3 and the liver surface 7 in the respective scanning lines are obtained from $\Delta t_{6,7}, \Delta t_{7,8}, \ldots, \Delta t_{n-1,n}$, ..., on the basis of $x_6$. These distances are given by the following equations (2):

$$x_7 = x_6 + (c/\Delta t_{6,7}) \tag{2}$$
$$x_8 = x_6 + (c/2)(\Delta t_{6,7} + \Delta t_{7,8})$$
$$\vdots$$
$$x_n = x_6 + (c/2)(\Delta t_{6,7}) + \Delta t_{7,8} + \ldots + \Delta t_{n-1,n})$$

The operations of the equations (2) are not always performed for adjacent ultrasonic scanning lines. They can be performed for nearby ultrasonic scanning lines, for example, $P_6$ and $P_8$ or $P_6$ and $P_9$, and the average thereof contributes to a decrease in error. The operations performed for the adjacent ultrasonic scanning lines produce a highly-precise result, and the operations performed for not adjacent but nearby ultrasonic scanning lines are very effective when the reflected waves are relatively near to the body surface, that is, when the liver surface 7 (outline) is virtually parallel to the body surface.

The above method according to the present invention makes use of a slight shift in high-frequency signals (waveforms) including phase information of adjacent reflected waves on a time basis. Because of the similarity between the waveforms of the adjacent reflected waves, exactness and precision of measurement can be considerably enhanced. The envelope of the waveforms is required only if the amplitude information based on which a tomographic image is formed is given. For example, if a 3-cycle pulse of 5 MHz is emitted, its resolution $\Delta x_A$ corresponding to a distance which is three times as long as the wavelength of the pulse, is expressed as follows: (the resolution is reduced to half since the wave is reflected)

$$\Delta x_A = 0.3 \text{ mm} \times 3 \times \tfrac{1}{2} = 0.45 \text{ mm}$$

If the phase information is used, the precision which is 1/10 times as high as that using the amplitude information and, in this case, the resolution $\Delta x_p$ is expressed as follows:

$$\Delta x_p = 0.3 \text{ mm} \times 1/10 \times \tfrac{1}{2} = 0.015 \text{ mm}$$

Consequently, $\Delta x_A >> \Delta x_p$ and it is found that the precision in measurement using the phase information is much higher than that using the amplitude information only.

As noted above, high precision cannot be achieved by conventional ultrasonic diagnostic apparatuses. With the present invention, it is thus possible to detect the irregularities of a liver surface or the like with a precision of ten times higher that in the conventional apparatuses. It is therefore possible to display the liver surface at a 10× magnification to observe its structure.

A method of obtaining the time $\Delta t_{6,7}, \Delta t_{7,8}, \Delta t_{8,9}, \ldots, \Delta t_{n-1,n}, \ldots$ from positions in the same phase is not limited to cross-correlation. The time can be obtained by orthogonally detecting a phase using a reference signal and by using a shift in the phase, or by tracing a shift in phase using a phase-locked loop circuit.

Figure 3:
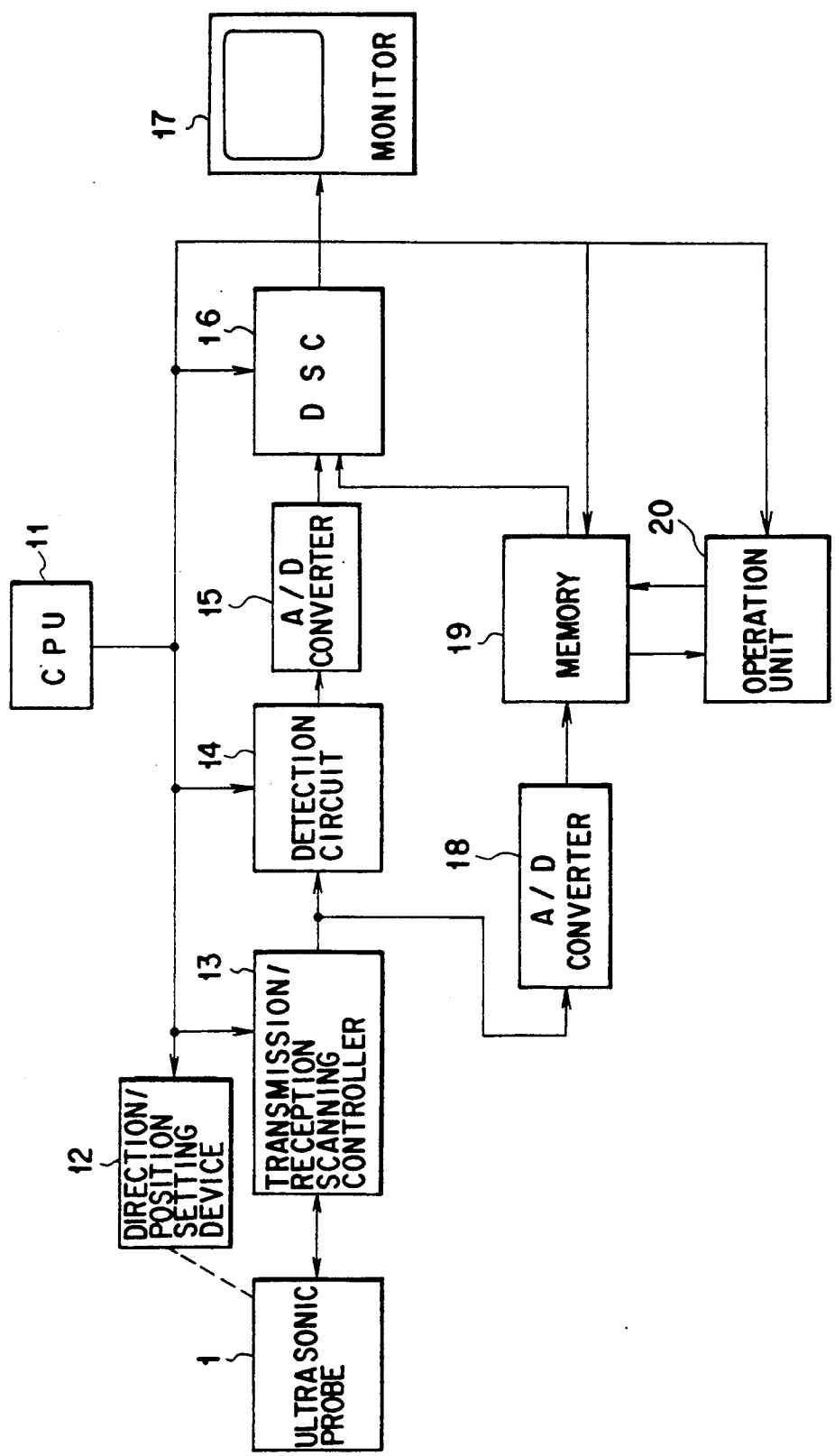
FIG. 3 is a block diagram of an ultrasonic imaging apparatus according to a first embodiment of the present invention.

FIG. 3 is a block diagram of an ultrasonic diagnostic apparatus capable of performing the above operations according to the first embodiment of the present invention. As shown in FIG. 3, pulses are transmitted from a transmission/reception scanning controller 13 to an ultrasonic probe 1 having a direction and a position that are set by a direction/position setting device 12. The ultrasonic probe 1 transmits ultrasonic pulses to a subject and receives reflected ultrasonic waves. The received waves are synthesized in the transmission/reception scanning controller 13, and a directional ultrasonic reception signal is output. The transmission/reception scanning controller 13 includes a pulser, a preamplifier, a transmission/reception delay circuit, an adder circuit, and the like and is controlled by a CPU 11.

The amplitude (envelope) of the ultrasonic reception signal output from the transmission/reception scanning controller 13 is detected by a detection circuit 14, and it is changed into a video signal. The video signal is A/D-converted by an A/D converter 15. The A/D-converted video signal is synthesized by a DSC 16 (digital scan converter) and is displayed as an image on the monitor 17. This is a normal process of forming a tomographic image.

The reception signal of the transmission/reception scan controller 13 is A/D-converted as a high-frequency signal by another A/D converter 18 and is stored in a memory 19. Upon receipt of a signal of the succeeding scanning line, cross-correlation between this signal and the signal of the preceding scanning line stored in the memory 19 is performed, thereby obtaining the maximum value of $\Delta t$. This value is sent to the DSC 16 and is superimposed on the tomographic image on the monitor 17. More specifically, the value $\Delta t$ is displayed by a line having strong luminance or a broken line so that it can be distinguished from the tomographic image and is processed independently thereof. The value $\Delta t$ is input to the memory 19. Since the value $\Delta t$ is superimposed on the tomographic image, it can be detected whether the value is correctly obtained or not. The value $\Delta t$ can be corrected and displayed in an enlarged manner.

The initial position is input/output to/from an operation unit 20 through the CPU 11 and an interface such as a mouse (not shown in FIG. 3). With respect to the processing after the transmission/ reception scanning controller 13, a signal output from the controller 13 can be digitally processed by the A/D converter 18 and, when the controller 13 processes a digital high-frequency signal, neither of the A/D converters 15 and 18 is needed.

An operation of the ultrasonic diagnostic apparatus according to the first embodiment will now be described, with reference to FIG. 4.

In step 100, a power supply is turned on to start the ultrasonic diagnostic apparatus. To acquire data of the 0-th scanning line, a transducer element corresponding to the 0-th scanning line transmits/receives an ultrasonic beam through steps 101, 102 and 103. In step 104, envelope detection information corresponding to the 0-th scanning line is obtained by transmission/reception of the ultrasonic beam, and then sent to the DSC 16. In step 105, data of a reflected wave corresponding to the 0-th scanning line is stored in the memory 19 by the transmission/reception. While the transducer element corresponding to the 0-th scanning line is transmitting-/receiving the ultrasonic beam, neither of steps 106 and 107 is executed, but the flow advances to step 108.

In steps 108 and 109, the 0-th scanning line is changed to the first scanning line. The flow goes to step 102 and then step 101 to acquire data of the first scanning line. In steps 102 and 103, a transducer element corresponding to the first scanning line transmits/receives an ultrasonic beam. In step 104, envelope detection information corresponding to the first scanning line is obtained by the ultrasonic beam, and then sent to the DSC 16. In step 105, data of a reflected wave corresponding to the first scanning line is stored in the memory 19 by the transmission/ reception. In step 106, an operation of cross-correlation between the reflected-wave data of the 0-th scanning line and that of the first scanning line is performed, thereby calculating phase data. The phase data is stored in the memory 19 and is supplied to the DSC 16. The flow then advances to step 108.

If the above steps are repeated for the second to n-th scanning lines, data of one tomographic image and data of one organ outline are obtained by the DSC 16. In the DSC 16, the organ outline is superimposed on the tomographic image in the DSC 16, and an image formed by the superimposition is displayed on the monitor 17. This operation continues until scan continuation is released in step 109.

Figure 5:
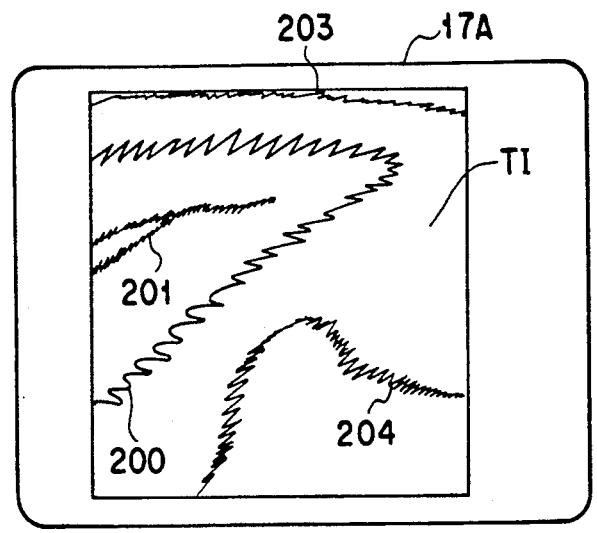
FIG. 5 is a view showing a display example of a tomographic image formed by the ultrasonic scan using the phased-array ultrasonic probe of the present invention.
Figure 6:
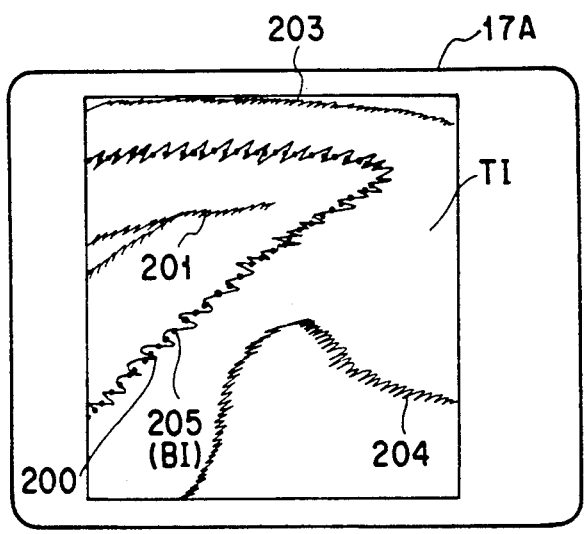
FIG. 6 is a view showing a display example of boundary data superimposed on the tomographic image formed by the ultrasonic scan of FIG. 5 using the phased-array ultrasonic probe of the present invention.
Figure 7:
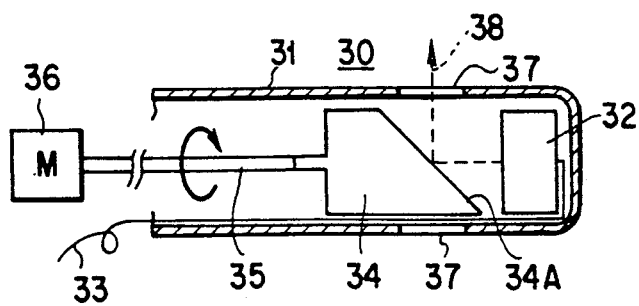
FIG. 7 is a cross-sectional view of a catheter ultrasonic probe according to the present invention.

Display examples of a tomographic image according to the present invention will be described, with reference to FIGS. 5 and 6. FIG. 5 shows an example of displaying only a tomographic image TI on a display surface 17A of the monitor 17. The tomographic image TI includes a liver boundary 200, vessels 201 in the liver, a body surface 203, and other organs 204. The liver boundary is indistinct. FIG. 6 shows an example of displaying the tomographic image TI and an organ outline 205 (BI) superimposed thereon on the display surface 17A of the monitor 17. The organ outline 205 (BI) is formed of a plurality of consecutive plots and superimposed on the liver boundary 200. Though the shape of the liver cannot be clearly distinguished only by the B mode image (tomographic image), it can be distinguished if the organ outline 205 (BI) is also displayed.

In the above examples, a linear boundary is automatically detected and, similarly, a planer boundary can be detected automatically.

Next an example of clearly displaying a boundary of a vessel will be described with reference to FIGS. 7 through 10. In this example, the phased-array ultrasonic probe 1 shown in FIG. 3 is replaced with a catheter ultrasonic probe 30 shown in FIG. 7.

The catheter ultrasonic probe 30 includes a pipe 31 having a diameter of several millimeters. One transducer 32 is arranged in the pipe 31. A cable 33 is connected to the transducer 32. Transmission pulses are supplied to the transducer 32 through the cable 33, and reception signals can be received from the transducer 32. A mirror body 34 is arranged in the pipe 31 and has a slant surface 34A serving as a mirror. The mirror body 34 is separated from the transducer 32 at a predetermined interval. A power transmission shaft 35 is connected to the mirror body 34 and is rotated by a motor 36. The mirror body 34 can thus be rotated by rotating the motor 36. While the mirror body 34 is rotating and the transducer 32 is transmitting/receiving ultrasonic pulses, ultrasonic waves 38 are transmitted/received through an ultrasonic transmittable window 37 formed in the pipe 31. The ultrasonic waves 38 radially scan a subject by the rotation of the mirror body 34.

Figure 8:
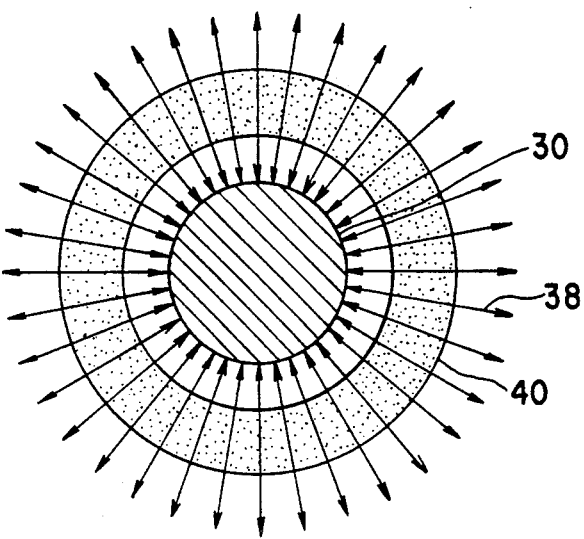
FIG. 8 is a schematic view of an ultrasonic scan using the catheter ultrasonic probe according to the present invention.
Figures 9, 10:
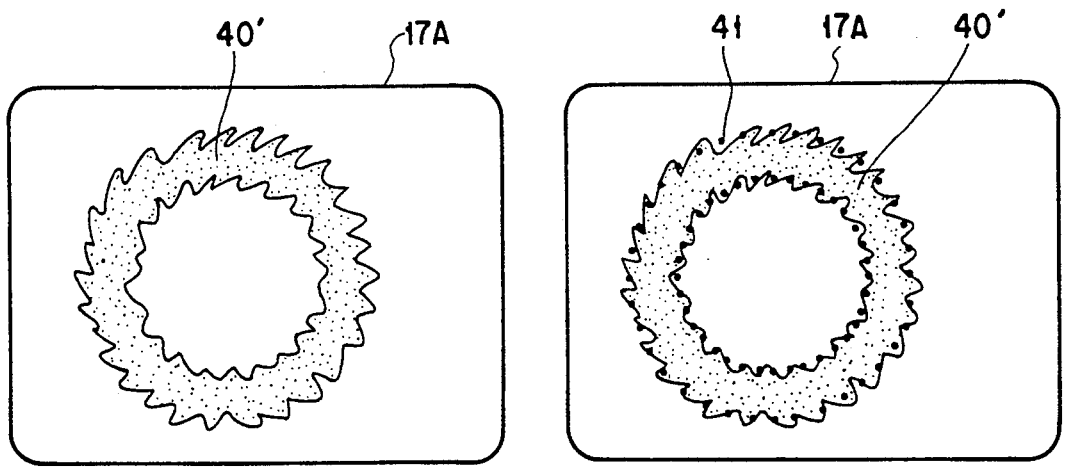
FIG. 9 is a view showing a display example of a tomographic image formed by the ultrasonic scan using the catheter ultrasonic probe of the present invention.
FIG. 10 is a view showing a display example of boundary data superimposed on the tomographic image of FIG. 9 formed by the ultrasonic scan using the catheter ultrasonic probe of the present invention.

FIG. 8 is a view showing that a radial scan is performed by inserting the catheter ultrasonic probe 30 in a vessel 40. As shown in FIG. 8, the ultrasonic waves 38 are radially transmitted and received. As shown in FIG. 9, the vessel 40 is radially scanned by the catheter ultrasonic probe 30, and a tomographic image 40' of the vessel 40 is displayed on the display surface 17A. As shown in FIG. 10, an outline 41 of the vessel 40 is displayed thereon, together with the tomographic image 40'. The outline 41 and tomographic image 40' are enlarged by a factor of several tens.

An ultrasonic imaging apparatus capable of color display according to a second embodiment of the present invention will be described, with reference to FIG. 11. This ultrasonic imaging apparatus includes a color processing circuit 21 for color-displaying the organ outline 205 (BI) on the image formed by the DSC 16. Therefore, the organ outline 205 (BI) is made clearer, and the organ can be distinguished more exactly.

Figure 12:
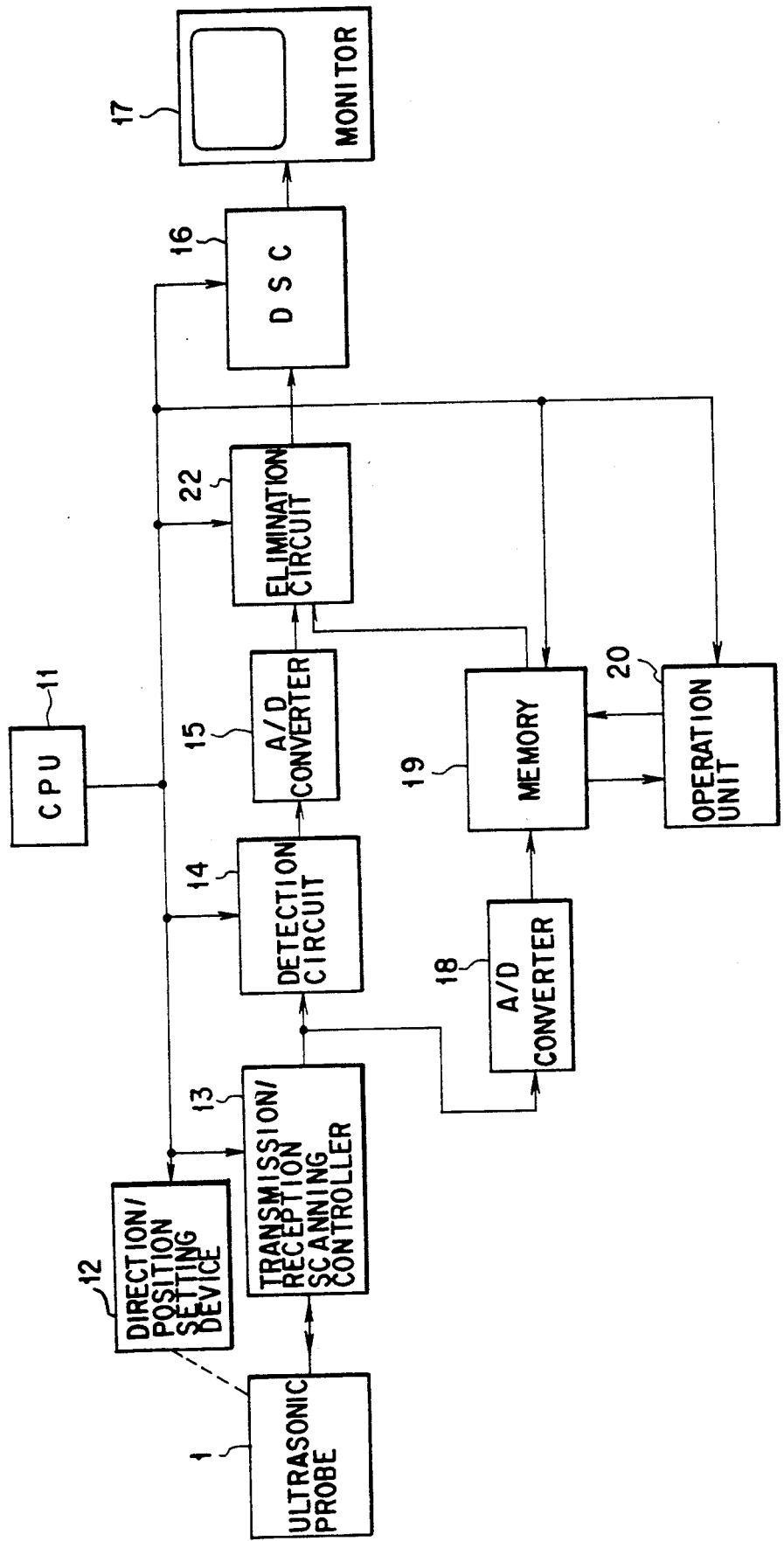
FIG. 12 is a block diagram of an ultrasonic imaging apparatus capable of region display according to a third embodiment of the present invention.
Figures 13, 14:
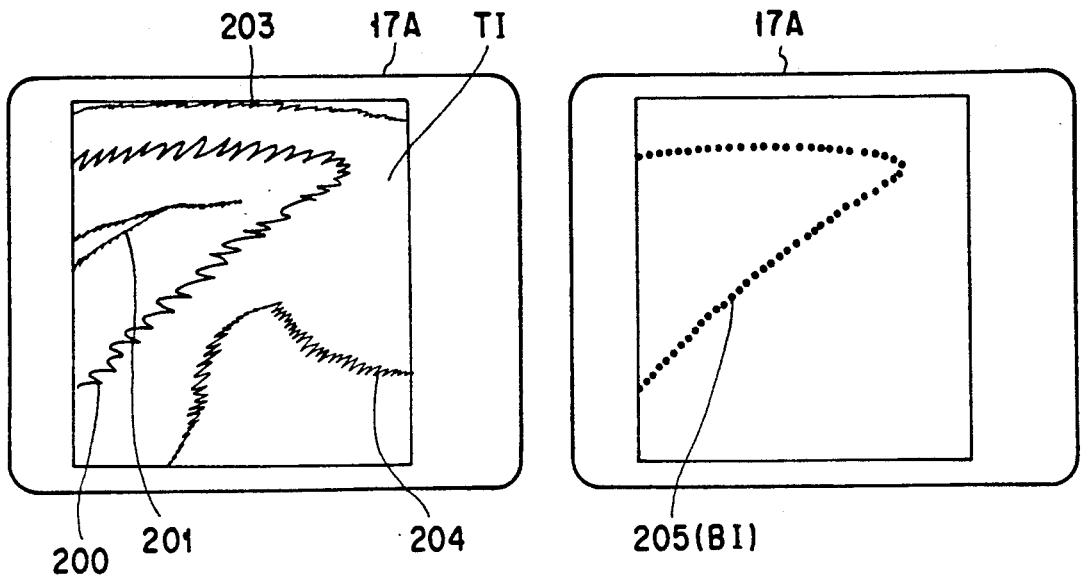
FIG. 13 is a view of a display example of a tomographic image in the ultrasonic imaging apparatus according to the third embodiment.
FIG. 14 is a view showing a display example of only boundary data in the ultrasonic imaging apparatus according to the third embodiment.
Figure 15:
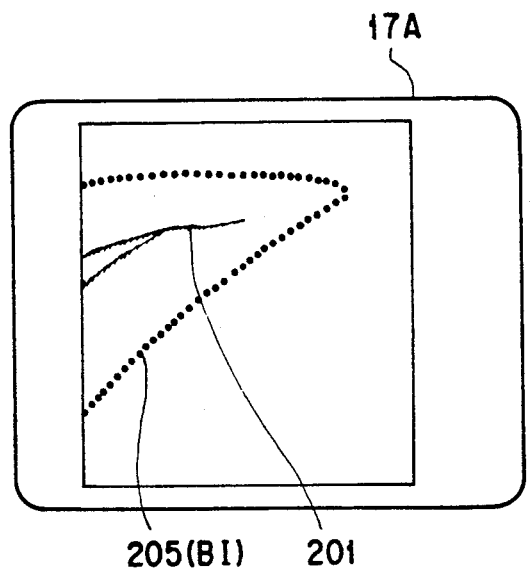
FIG. 15 is a view showing a display example of only a liver in the ultrasonic imaging apparatus according to the third embodiment.

An ultrasonic imaging apparatus capable of region display according to a third embodiment of the present invention will be described with reference to FIG. 12. This ultrasonic imaging apparatus comprises an elimination circuit 22 for displaying only the liver including the vessels 201 in the tomographic image TI using the organ outline 205 (BI). FIG. 13 shows an example of displaying the tomographic image TI on the display surface 17A, and FIG. 14 shows an example of displaying the organ outline 205 (BI) thereon. If a portion other than the organ outline 205 (BI) is eliminated from the tomographic image TI, only the liver including the vessels 201 can be displayed, as shown in FIG. 15.

The above information can be used not only for shaded surface display and elimination of the portion outside the liver but also in various other situations. For example, since the thickness of a ventral wall can be detected, a sound field disturbed by subcutaneous fat or muscle of the ventral wall is corrected, with the result that a high-resolution image can be formed. The following phenomenon is well known as a typical example. When a pancreas is observed at a cross section perpendicular to the median of a human body, since a lenticular structure exists in each of the right and left ventral walls with respect to the median, an internal organ imaged under the lenticular structure is slightly shifted right and left and thus imaged in a dual fashion. According to the present invention, the outline of the lenticular structure can be automatically detected and its size can be easily taken; accordingly, an image free of blur can be formed by correcting the lens effect.

Figure 17:
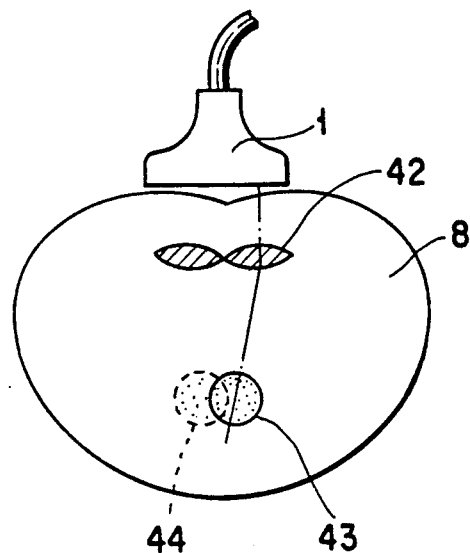
FIG. 17 is a schematic view of operation of the ultrasonic imaging apparatus according to the fourth embodiment of the present invention.

An ultrasonic imaging apparatus capable of correcting a sound field according to the fourth embodiment of the present invention will be described with reference to FIG. 16. As shown in FIG. 16, the apparatus comprises a sound field correction circuit 23 for correcting a sound field of the tomographic image TI using the organ outline 205 (BI). FIG. 17 shows a lenticular structure 42 formed in a subject 8. An ultrasonic beam emitted from the ultrasonic probe 1 is transmitted through the lenticular structure 42 and deflected, and a false image 44 is displayed near a tissue 43. The shape of the lenticular structure 42 is thus detected using the organ outline 205 (BI), and a sound field free from the lenticular structure 42 can be calculated by the detected shape. Since an ultrasonic scan is performed on the assumption that the lenticular structure 42 is not present in the subject 8, the false image 44 can be eliminated.

Figure 18:
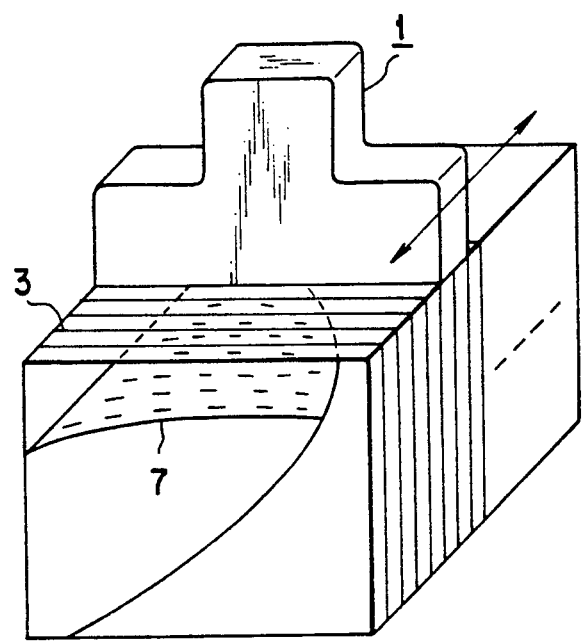
FIG. 18 is a schematic view of an ultrasonic scan of a three-dimensional region using the phased-array ultrasonic probe according to the present invention.

FIG. 18 shows an enlarged three-dimensional region in which the liver surface 7 is detected from the body surface 3 by ultrasonic scanning using the phased-array ultrasonic probe shown in FIG. 1. The ultrasonic probe 1 is mechanically moved in a direction perpendicular to tomographic sections, and a signal of each of the tomographic sections is stored in the memory 19, shown in FIG. 3, in correspondence with a position of the ultrasonic probe 1, thereby performing a two-dimensional operation.

Figure 19:
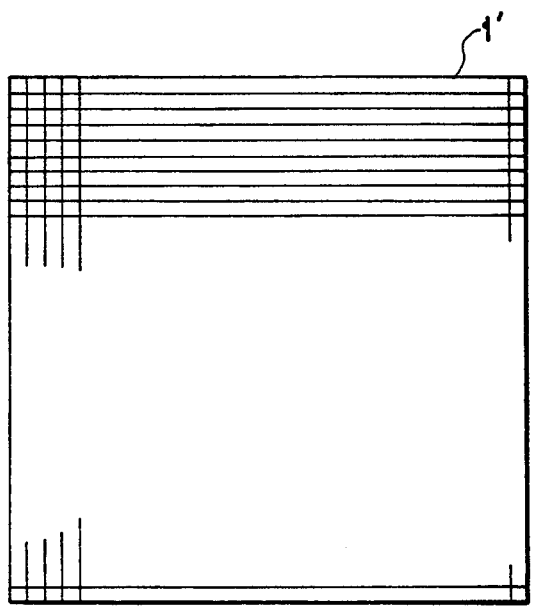
FIG. 19 is a schematic view of an ultrasonic scan of a three-dimensional region using a three-dimensional matrix type phased-array ultrasonic probe according to the present invention.

FIG. 19 shows an electronic scan for acquiring the same information as obtained by the mechanical scan shown in FIG. 18. An ultrasonic probe 1' used for the electronic scan includes a plurality of transducer elements which are arranged a matrix. The ultrasonic probe 1' selects a group of the transducer elements to transmit/receive ultrasonic beams in the longitudinal and lateral directions of a subject.

Figure 20:
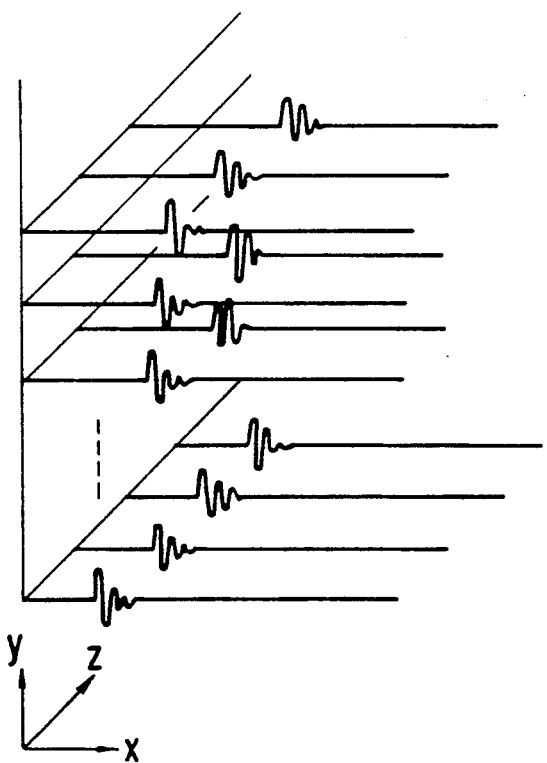
FIG. 20 is a schematic view showing reflected-wave signals produced by the ultrasonic scan of the three-dimensional region.

FIG. 20 shows signals which are three-dimensionally obtained from the liver surface 7. Since information of depth from the body surface to the two-dimensional liver surface 7 is three-dimensional information (x, y, z), shaded surface display can be performed by the normal three-dimensional image processing.

The three-dimensional image processing can be performed by a three-dimensional image processor 24 shown in FIGS. 21 to 24. Using the three-dimensional image processor 24, irregularities of the liver surface 7 are displayed, and information useful for diagnosis can be acquired. Especially, since the liver surface 7 is spaced away from the body surface 3 by 1 to 2 cm and is located substantially in parallel to the body surface 3, high-frequency ultrasonic waves of 5 MHz or more can be sharply focused upon and reflected by the liver surface 7, with the result that a high-resolution image can be formed.

Though a liver surface usually contacts a peritoneum, they are separated from each other if a liquid similar to a body fluid is injected between them from outside the body. The liver surface can be clearly imaged. In the three-dimensional image processor 24, three-dimensional image information of only the ventral wall above the peritoneum is removed, and signals reflected by the liver surface can be displayed by shaded surface display, thereby forming a clear image showing irregularities of the liver surface. This clear image can be obtained by the apparatuses shown in FIGS. 22 and 23.

A method of displaying the surface of a specified part of a subject by three-dimensional image processing based on three-dimensional image information obtained from an X-ray CT scanner or the like, is being studied. However, this method is not practical since a doctor or an engineer has to remove data of other parts of the subject covering the surface of the specified part thereof and time is required to do it. Data collected by the X-ray CT scanner does not correspond to phase of ultrasonic waves but to amplitude thereof.

In the present invention, since the liver surface can be detected automatically, data of the ventral wall above the liver surface can be easily removed by three-dimensional image processing. More specifically, if a liquid is injected between the peritoneum and liver surface, they are separated, and a smooth surface of the peritoneum is detected automatically. If data of the ventral wall (which may include the liquid) above the liver surface is removed, the liver surface can be clearly displayed without degrading information of irregularities of the liver surface.

Of course, the liver surface can be detected and data of a portion above the liver surface on the body surface side can be removed. An amplitude detection luminance signal obtained from a normal tomographic image can be used as a signal reflected by the liver surface. If position data of the liver surface detected using phase information is used to observe the details of the irregularities, an image of remarkably high resolution can be formed. Both of these methods can be used. In the apparatus according to the present invention, data of a portion of the ventral wall covering the liver surface can be removed automatically and the minute structure of the liver surface can be imaged; therefore, correct information can be easily obtained without any hands. The apparatus of the present invention is practical.

Furthermore, the apparatus of the present invention is less invasive and is safer than a peritoneoscopy in which a liver surface is optically detected by inserting a peritoneoscope between the liver surface and a peritoneum through a cavity formed in a body surface, which has been used conventionally.

The ultrasonic diagnostic apparatus shown in FIG. 3 comprises the memory 19, operation unit 20, and monitor 17 serving as a display. However, if the apparatus has two-dimensional image information, i.e., tomographic image information (FIG. 2) of reflected signals having phase information or three-dimensional image information (FIG. 5) as digital information, the digital information can be input to an image processing terminal such as a work station prepared separately from the ultrasonic diagnostic apparatus. As a result, the line and plane of a tomographic image can be distinguished by the terminal, and a specified surface of the tomographic image can be displayed using the digital information.

In the above-described example of the liver surface, the liver is almost covered with ribs, a parallel movement of the ultrasonic probe in the Z direction in FIG. 18 is insufficient for displaying the liver surface, and the probe has to rotate around the y-axis shown in FIG. 18. In the above embodiments, the display of the liver surface is described in detail, but they are not limited to the liver as a target.

The above embodiments can be achieved by the ultrasonic imaging apparatuses shown in FIGS. 21 to 24. FIG. 21 shows an ultrasonic imaging apparatus in which three-dimensional display and superimposition display are combined. This apparatus comprises a three-dimensional image processor 24.

Figure 22:
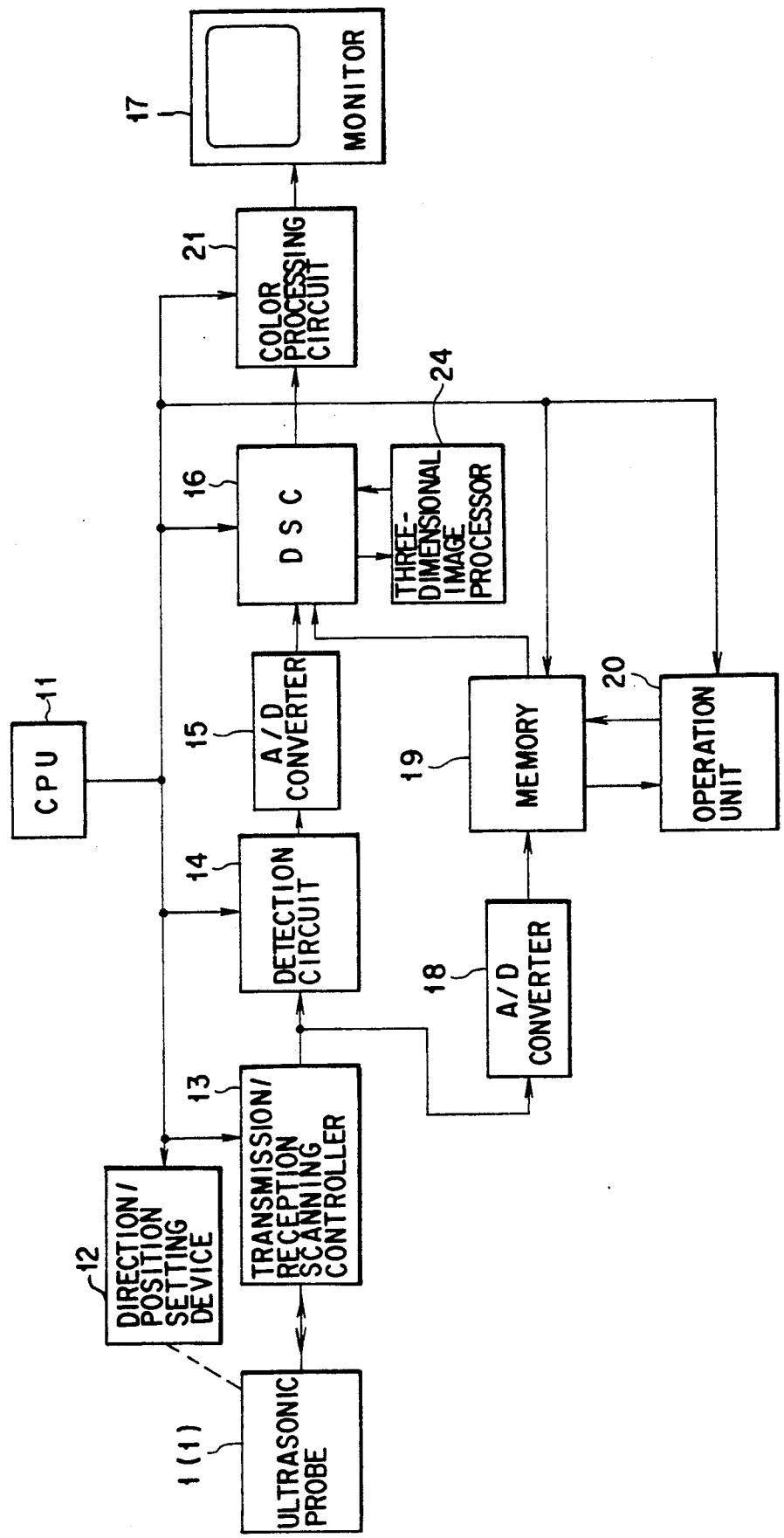
FIG. 22 is a block diagram of an ultrasonic imaging apparatus in which three-dimensional display and color display are combined, according to a sixth embodiment of the present invention.

FIG. 22 shows an ultrasonic imaging apparatus in which three-dimensional display and color display are combined. This apparatus comprises a color processing circuit 21 and a three-dimensional image processor 24.

Figure 23:
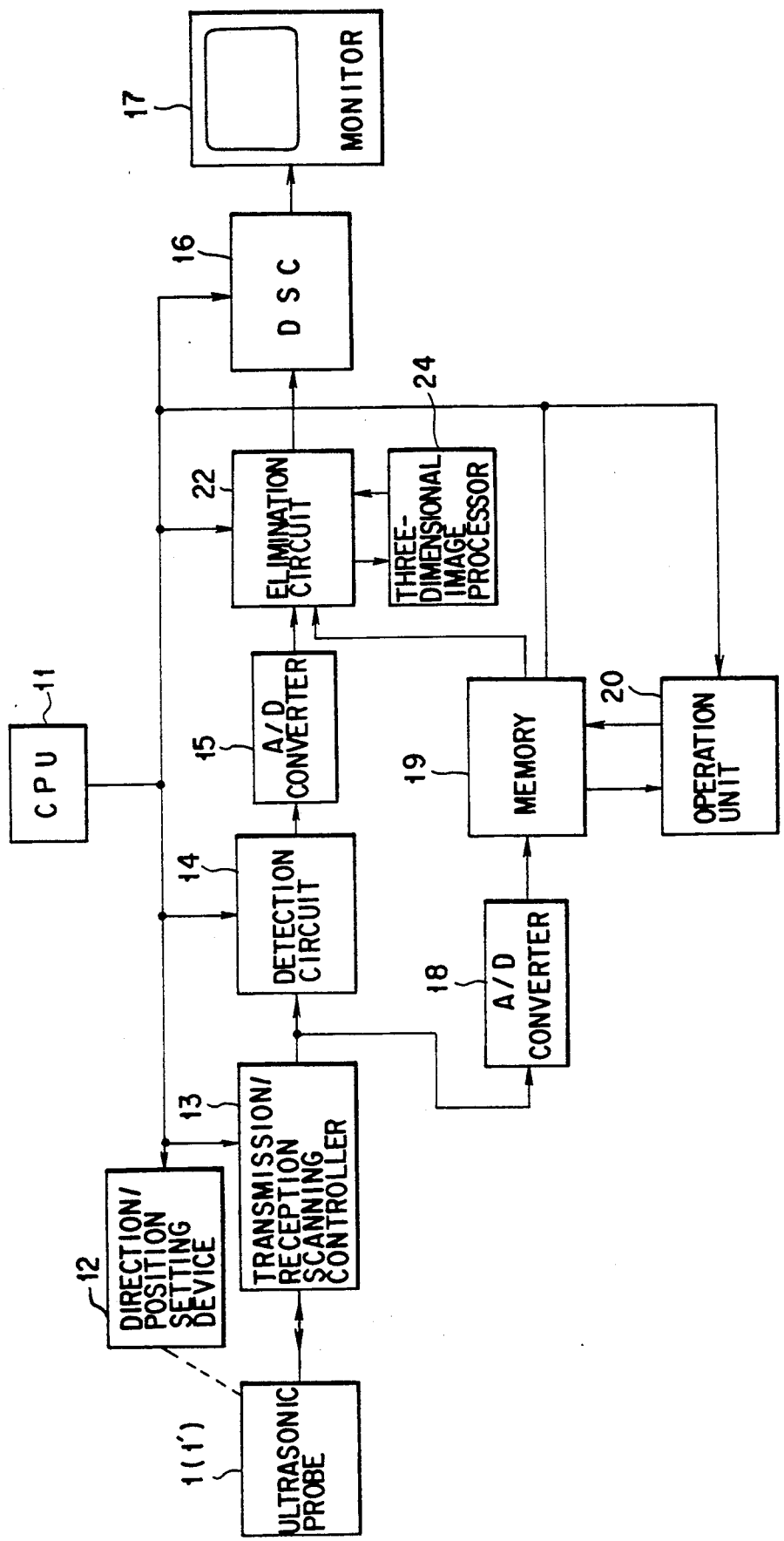
FIG. 23 is a block diagram of an ultrasonic imaging apparatus in which three-dimensional display and region display are combined, according to a seventh embodiment of the present invention.

FIG. 23 shows an ultrasonic imaging apparatus in which three-dimensional display and region display are combined. This apparatus comprises an elimination circuit 22 and a three-dimensional image processor 24.

FIG. 24 shows an ultrasonic imaging apparatus in which three-dimensional display and sound field correction are combined. This apparatus comprises a sound field correction circuit 23 and a three-dimensional image processing apparatus 24.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An ultrasonic imaging apparatus having an ultrasonic probe for transmitting ultrasonic beams to a subject along a plurality of ultrasonic scanning lines, for receiving ultrasonic beams reflected from the subject along the plurality of ultrasonic scanning lines, the reflected ultrasonic beams including reflected pulses, and for obtaining ultrasonic information about the subject based on ultrasonic reflection data items contained in the reflected ultrasonic beams, the ultrasonic imaging apparatus comprising:

designation means for designating a time interval including one of the reflected pulses;

phase information calculation means for calculating phase information based on ultrasonic reflection data items corresponding to at least two of the ultrasonic scanning lines, which are near to each other, based on a phase shift in the time interval between the at least two ultrasonic scanning lines; and boundary position information generation means for generating boundary position information about a specified part of the subject for each of the plurality of ultrasonic scanning lines, based on the phase information calculated by the phase information calculation means and on boundary position information of a predetermined reference scanning line.

2. The ultrasonic imaging apparatus according to claim 1, further comprising display means for displaying the boundary information superimposed on the ultrasonic information.

3. The ultrasonic imaging apparatus according to claim 1, further comprising:

elimination means for eliminating information of parts other than the specified part of the subject from the ultrasonic information based on the boundary information; and display means for displaying the ultrasonic information about the specified part of the subject obtained by said elimination means.

4. The ultrasonic imaging apparatus according to claim 1, further comprising:

correction means for correcting the ultrasonic information based on the boundary information to erase false image information included in the ultrasonic information; and display means for displaying the ultrasonic information from which the false image information is erased.

5. The ultrasonic imaging apparatus according to any one of claims 2 to 4, wherein said ultrasonic information includes a tomographic image.

6. The ultrasonic imaging apparatus according to claim 2, wherein said boundary information includes a plurality of plots along an outline of the specified part of the subject.

7. The ultrasonic imaging apparatus according to claim 1, wherein said phase information calculation means includes means for calculating, as phase information, a shift in a cross-correlation function between ultrasonic reflection data items of at least two of the plurality of ultrasonic scanning lines, which are near to each other.

8. The ultrasonic imaging apparatus according to claim 1, wherein information calculation means includes means for calculating phase information between ultrasonic reflection data items of two adjacent ones of the plurality of ultrasonic scanning lines.

9. The ultrasonic imaging apparatus according to claim 1, wherein said ultrasonic probe is a phased-array ultrasonic probe.

10. The ultrasonic imaging apparatus according to claim 1, further comprising means for mechanically moving said ultrasonic probe in such a manner that the subject is three-dimensionally scanned with the ultrasonic beams transmitted from and received by said ultrasonic probe.

11. The ultrasonic imaging apparatus according to claim 1, wherein said ultrasonic probe is a three-dimensional phased-array ultrasonic probe.

12. The ultrasonic imaging apparatus according to claim 1, wherein said ultrasonic probe is a catheter ultrasonic probe.

13. The ultrasonic imaging apparatus according to claim 1, including means for displaying the outline of said specified part of the subject two-dimensionally based on the boundary information.

14. The ultrasonic imaging apparatus according to claim 1, including means for displaying the outline of said specified part of the subject three-dimensionally based on the boundary information.

15. The ultrasonic imaging apparatus according to claim 1, further comprising means for displaying the boundary information in color.

16. The ultrasonic imaging apparatus according to claim 1, wherein said ultrasonic probe is a two-dimensional phased-array ultrasonic probe, and said specified part of the subject is a liver.

17. The ultrasonic imaging apparatus according to claim 1, wherein said ultrasonic probe is a catheter ultrasonic probe, and said specified part of the subject is a vessel.

18. The ultrasonic imaging apparatus according to claim 1, further comprising:

image processing means for image-processing the boundary information; and display means fo displaying the boundary information image-processed by said image processing means.

19. The ultrasonic imaging apparatus according to claim 18, wherein said image processing means includes an enlargement display function.

* * * * *

UNITED STATES PATENT AND TRADEMARK OFFICE
CERTIFICATE OF CORRECTION

PATENT NO. : 5,309,914
DATED : May 10, 1994
INVENTOR(S) : Kazuhiro IINUMA

It is certified that error appears in the above-indentified patent and that said Letters Patent is hereby corrected as shown below:

Claim 18, column 12, line 55, change "fo" to --for--.

Signed and Sealed this

Seventeenth Day of January, 1995

Attest:

BRUCE LEHMAN

Attesting Officer

Commissioner of Patents and Trademarks